Aug. 8, 1961
I. R. BEATTIE ET AL
2,995,016
SEPARATION OR PARTIAL SEPARATION OF
COMPONENTS OF A LIQUID MEDIUM
Filed Feb. 2, 1959
5 Sheets-Sheet 1
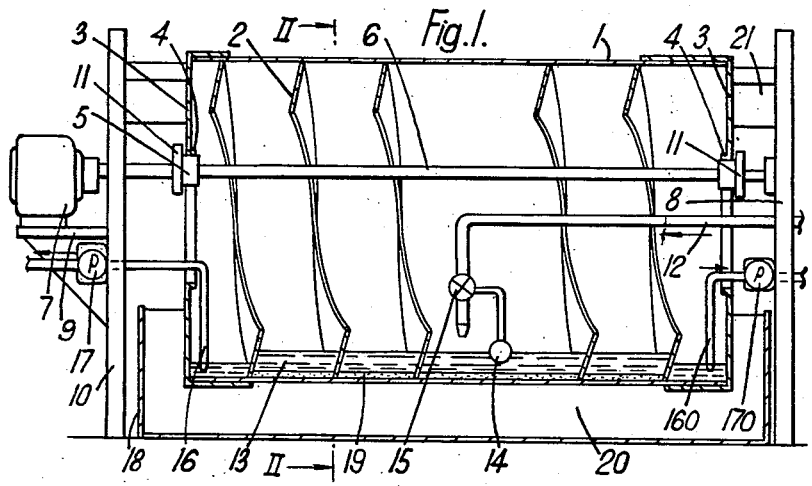
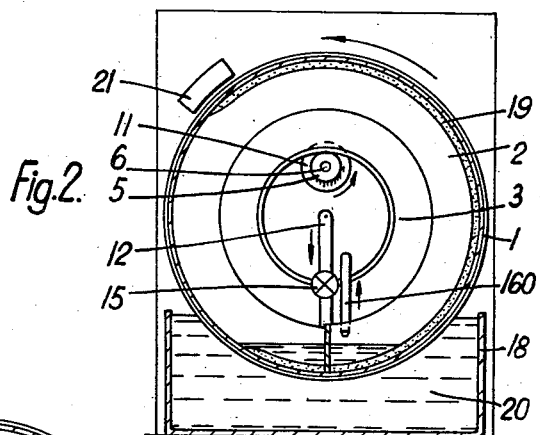
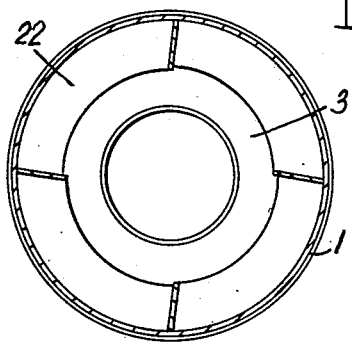
Inventors
Ian Robert Beattie
Victor Gold
By
Bailey, Stephens & Huettig
Attorneys

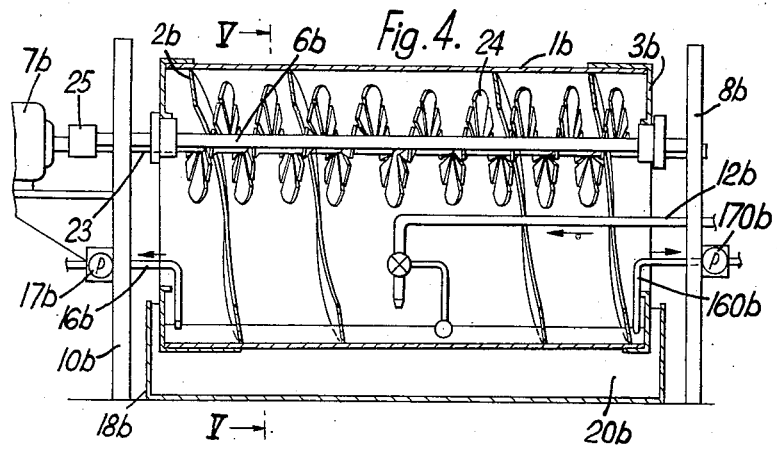
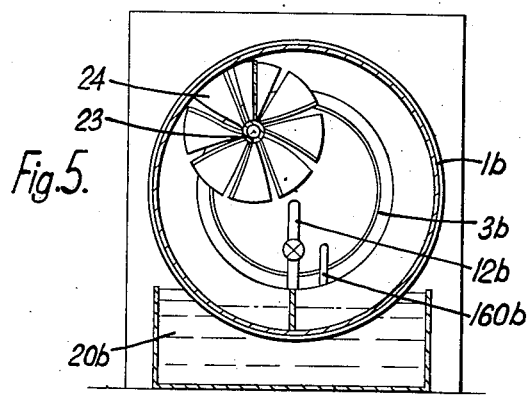
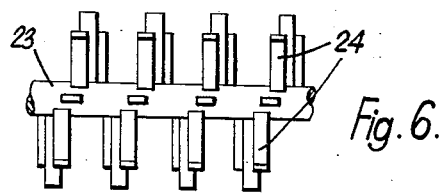

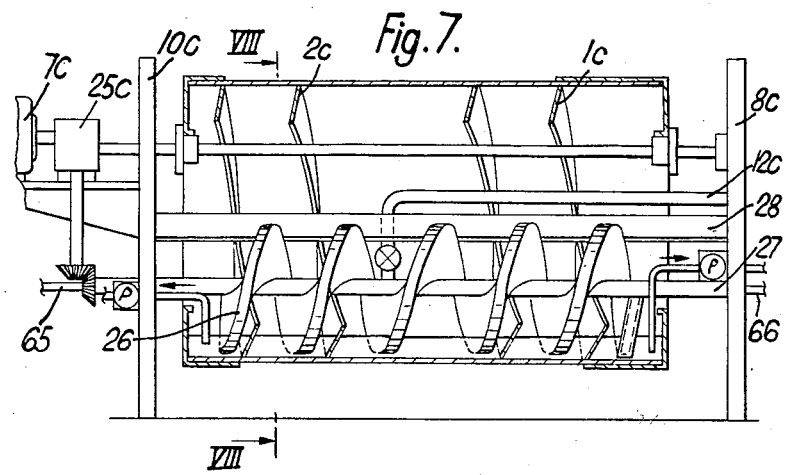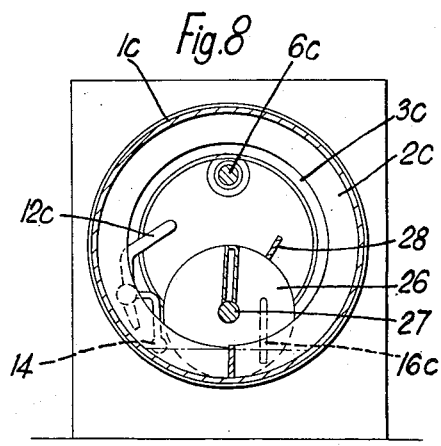

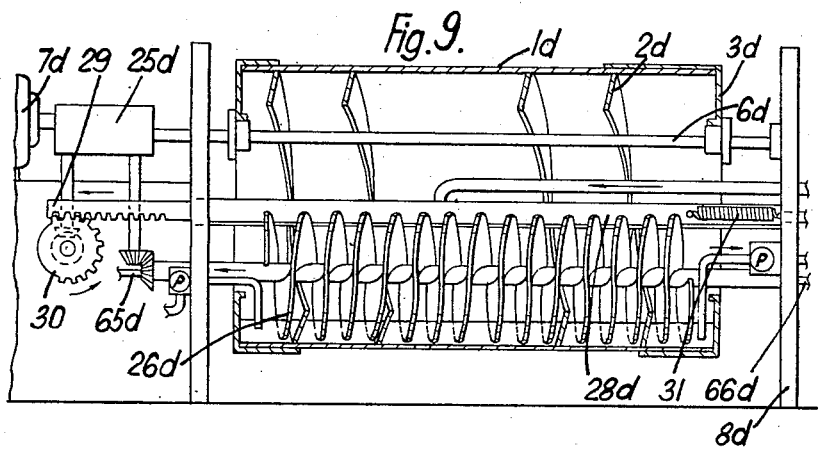

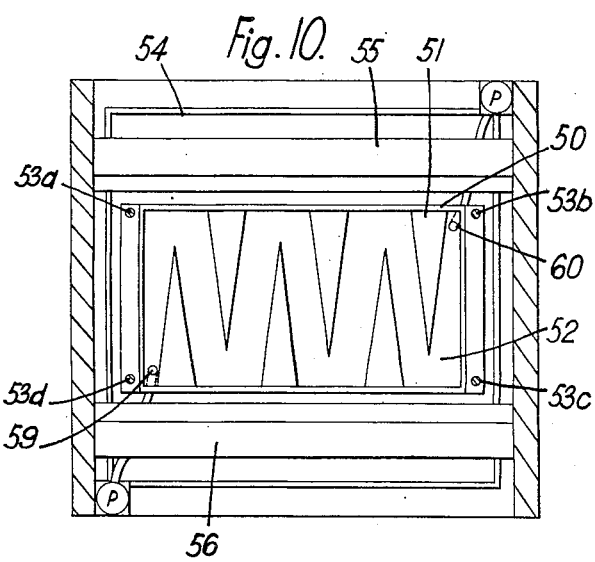
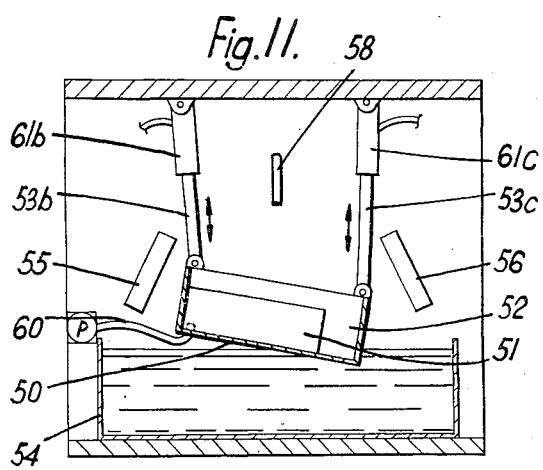

United States Patent Office 2,995,016
Patented Aug. 8, 1961

2,995,016
SEPARATION OR PARTIAL SEPARATION OF COMPONENTS OF A LIQUID MEDIUM
Ian Robert Beattie, 19B Cliff Parade, Leigh-on-Sea, England, and Victor Gold, 7 Manor Gardens, South Croydon, England
Filed Feb. 2, 1959, Ser. No. 790,651
Claims priority, application Great Britain Feb. 6, 1958
6 Claims. (Cl. 62—58)

This invention relates to the separation or partial separation of components of a liquid medium.

It is well known that liquid mixtures may be separated by fractional crystallisation. However, heretofore such methods have been generally cumbersome, time consuming or inefficient. This invention is particularly directed to a convenient process whereby multiple or fractional crystallisations may be carried out continuously, on either a large or a small scale.

According to the invention, a process for the separation or partial separation of components of a liquid medium comprises feeding the liquid mixture into a movable duct, cooling a portion of the liquid to form a solid phase carried by the duct, moving the duct to raise the solid phase relative to the liquid phase, warming a suitable portion of the solid to cause the solid to liquefy and the melt to descend by gravity to a cooler region where it again partially solidifies whilst the mother liquors have passed along the duct, so that the separated or partially separated components are moved towards opposite ends of the duct, and withdrawing the separated fractions.

The process of the invention is applicable to liquid mixtures of all types, including suspensions and emulsions. For example the process can be used to separate mixtures of cresols, to purify salt water or to concentrate fruit juices.

Various forms of apparatus can be used to carry out the process of the invention. Some examples of these are shown in the accompanying drawings in which:

FIGURE 1 is a section of one form of apparatus;
FIGURE 2 is a section along the line II—II in FIG. 1;
FIGURE 3 is a detail of an apparatus similar to that shown in FIG. 1;
FIGURE 4 is a section of a modification of the apparatus shown in FIG. 1;
FIGURE 5 is a section along the line V—V in FIG. 4;
FIGURE 6 is a detail of part of a modification of the apparatus of FIGS. 4 and 5;
FIGURE 7 is a section of another form of apparatus;
FIGURE 8 is a section along the line VIII—VIII in FIG. 7;
FIGURE 9 is a section of a modified form of the apparatus shown in FIGS. 7 and 8;
FIGURE 10 is a sectional plan of a further form of apparatus;
FIGURE 11 is a sectional elevation of the apparatus shown in FIG. 10.

The form of apparatus shown in FIGURES 1 and 2 consists of a horizontally disposed hollow cylinder 1 which has a helical thread 2 on its inner surface. The cylinder is closed by annular insulated end plates 3 each of which has a flange extending along the cylinder to insulate the end compartment. The cylinder is rotated by engagement of a collar 4 on the inner edge of the end plates 3 with friction drive wheels 5 carried by a shaft 6 driven at one end by a motor 7. The shaft 6 is mounted at its other end on a support member 8 and the motor 7 is mounted on a plate 9 carried by a second support member 10. Axial movement of the cylinder 1 is prevented by flanges 11 on the drive wheels 5.

The liquid mixture to be separated is introduced into the centre of the cylinder 1 through the space in the end wall 3 by a feed pipe 12. The level of the liquid 13 in the cylinder 1 is controlled by a constant level device which comprises a float 14 which operates the valve 15 in the feed pipe 12. The separated fractions are removed from opposite ends of the cylinder 1 through outlet tubes 16 and 160 by pumps 17 and 170. The lower part of the cylinder 1 dips into a refrigerating bath 18 so that solid material 19 is formed and adheres to the wall of the cylinder 1. The level of the refrigerant 20 in the refrigerating bath 18 is preferably above the level of the liquid 13 in the cylinder 1, as shown in FIGS. 1 and 2.

The solid material 19 adhering to the walls of the cylinder is carried as the cylinder 1 rotates past a heating element 21 which is positioned past top dead centre in the direction of rotation and which extends along the length of the cylinder 1 completely. The solid 19 is completely melted there and runs forward under gravity following the thread 2 into the cooled portion of the cylinder. For example, when the solid material just to the left of one of the blades 2 moves through more than 180°, and is then melted, it will flow down the wall under the influence of gravity on the right hand side of the spiral whereas, in the meanwhile, the still liquid phase has been transferred one step to the right, so that the melted substance will mix with the liquid in the preceding section. The gravitational forces thus cause a liquid phase enriched in higher melting fraction to move along the thread (to the right, FIG. 1) whereas the correspondingly depleted liquid phase is moved in the opposite direction (to the left, FIG. 1) by rotation of the thread.

The cylinder 1 may be driven intermittently or continuously. The speed of rotation and the method of driving it clearly depend to some extent on the freezing characteristics of the particular liquid mixture being separated.

The heating element 21 may be heated electrically or with steam whichever is convenient. In some cases it may be dispensed with as the solid formed will melt at room temperature. Similarly the cooling bath 18 may be unnecessary in certain cases.

Various modifications of the apparatus shown in FIGS. 1 and 2 may be made. Multistart threads may be used instead of a single start thread. Thus FIG. 3 shows a cylinder 1a for use in the apparatus of FIG. 1 which has a four start thread 22.

In the apparatus shown in FIGS. 1 and 2 the heating means were shown outside the cylinder. Other methods of melting the solids can be used however, for example, in the apparatus shown in FIGS. 4 and 5 a spiral 24 consisting of a set of blades arranged helically on the shaft 23 is used. The radius of the spiral 24 is less than the radius of the cylinder 1b and it is positioned so that it intermeshes with the thread 2b on the cylinder 1b at a point past top dead centre. In the apparatus shown the pitch of the spiral 24 is half that of the thread 2b and it is rotated by the motor 7b through the gears in the box 25 at an angular velocity twice that of the cylinder 1b to prevent the spiral 24 from moving out of the cylinder 1b. Because of the difference in radii and in the number of turns of the two spirals the peripheral speed of the cylinder 1b will in general differ from that of the spiral 24 and so that the wall of the cylinder 1b will scrape over the blades of the spiral 24. The solid is thus brought into contact with the heated spiral 24 for sufficiently long time to melt it.

Preferably the blades of the spiral 24 have the shape shown in FIG. 6, as this is more efficient. The form shown in FIGS. 4 and 5 is shown for clarity of the drawings.

In the apparatus shown in FIGS. 7 and 8, the liquid mixture is fed into an internally threaded cylinder 1c containing a hollow coil 26 through which refrigerant passes. Both the coil 26 and the cylinder 1c are rotated by shafts 6c and 27 at the same angular velocity driven by the motor 7c and the gears in the gear box 25c. The solid phase in this case adheres to the spiral 26 and is removed at a point past top dead centre by a heated scraper 28. The depleted liquid mixture 13c is moved in the opposite direction by the rotation of the outer cylinder 1c. The feeding means and means for withdrawing the separated components are similar to those shown in FIGS. 1 and 2.

The embodiment shown in FIG. 9 is generally similar to that shown in FIGS. 7 and 8. However, the efficiency of the apparatus is increased by increasing the number of turns of the refrigerated coil 26d with consequential increase in the speed of its rotation relative to the speed of the outer cylinder 1d. The cylinder 1d and the coil 26d are driven by the same motor 7d and the required difference in speeds of rotation is achieved by suitable gears in the gear box 25d.

The solid is removed by a heated scraper 28d which is splined at the end 29 and engages a partly toothed wheel 30 to form a rack and pinion. The scraper 28d is anchored to the support member 8d by a spring 31. The scraper 28d is suitably shaped so that melted solid will collect in it and flow forward to the compartment in the outer cylinder 1d next to the compartment in which the solid was formed. A scraper 28d, V or U shaped in cross-section which is deeper at one end than the other and having holes spaced at intervals corresponding to the pitch of the outer spiral 1d is suitable. The rack and pinion mechanism causes the scraper 28d to move across three turns of the refrigerated coil 26d during one revolution of the outer cylinder 1d against the action of the spring 31. At the end of each revolution of the outer cylinder 1d the scraper 28d is reciprocated by the spring 31. This mechanism ensures that the solid formed on the coil in one compartment of the cylinder is moved forward into the next compartment on melting.

The refrigerated coil 28c or 28d may be such that the flat outer surface only is refrigerated and the width of the flat portions of the coil 28c may be about equal to the pitch of the outer spiral 2c.

Another further form of apparatus is shown in FIG. 10. It comprises a trough 50 which is divided by triangular partitions 51 into a zig-zag track 52.

The apparatus is tilted in different directions by rods 53a, b, c, and d which are reciprocated by hydraulic or other actuators 61a, b, c, and d so as to bring different parts of the channel 52 in to tilt the trough both longitudinally and transversely so as to heated zones, or cooled zones, and also to allow liquid portions of material to flow in any desired direction along the zig-zag path 52.

The means of operation is closely related to that of the rotating cylinder. Essentially some solid is frozen by dipping one edge of the trough 50 into a cooling bath 54 (rods 53a and b short, c and d long), the trough 50 is then tilted diagonally downwardly towards the upper left, FIG. 10, so that the mother liquors flow away from the solid in the required direction (rod 53c short a long b and d intermediate), the trough 50 is tipped in another direction (diagonally downwardly towards the upper right, FIG. 10) and the frozen material warmed by a heater 55 so that it melts and runs down in the opposite direction along the zig-zag path 52 to that taken by the mother liquors (rods 53d short b long a and c intermediate). The next stage consists in bringing the other edge of the trough 50 into the refrigerating bath 54 (rods 53 a and b long, c and d short) and then suitably tilting the trough so that the mother liquors and melted solid flow along the track in the same opposed directions as before. The heater 56 is used to melt the solid formed at this stage. The trough 50 is restored to the original position considered above, thereby completing the cycle. The sequence is repeated in a continuous manner.

The separated fractions are withdrawn through pipes 59 and 60 at each end of the track 52 and the liquid mixture is fed into the track 52 near the centre of the trough 50.

A certain amount of conservation of latent heat, as in a distillation column, can be achieved in the operation of all modifications if a temperature gradient is arranged in such a manner that partial melting of the solid phase occurs during its upward progress. This results in some reflux and liquid-solid equilibration and hence increased efficiency of separation without (in principle) additional heat input.

We claim:

1. A process for the separation or partial separation of components of a liquid medium, which comprises feeding the liquid mixture into a movable and regularly winding duct, cooling a surface in contact with the liquid to form an adhering solid phase, moving the duct to alter the relative levels of portions of the duct, simultaneously raising the solid phase relative to the liquid phase, warming a suitable portion of the solid to cause the solid phase to liquefy and the melt to flow by gravity to a cooler region of the duct where it again partially solidifies at positions along the duct differing from those in which the solid phase was first formed, movement of the duct causing the mother liquors to pass along the duct so that the separated or partially separated components are moved towards opposite ends of the duct without being brought into contact with freshly introduced liquid mixture and withdrawing the separated fractions.

2. A process as claimed in claim 1, in which the solid passes through a temperature gradient so that refluxing occurs as the solid is raised.

3. A process as claimed in claim 1, in which the liquid mixture is fed into a cylinder having an internal thread, which is rotated about its axis and cooled adjacent its bottom so that the solid phase is formed on a surface in the lowest region of the cylinder and then melted at a position past top dead center in the direction of rotation.

4. A process as claimed in claim 3, in which the solid is heated by a heated spiral positioned inside the cylinder such that it contacts the cylinder walls at a point past top dead center.

5. A process as claimed in claim 3, in which the solid phase forms on the surface of a refrigerated coil inside the internally threaded cylinder rotated at a rate correlated to that of the cylinder and solid is removed from the refrigerated coil by a heated scraper.

6. A process as claimed in claim 1, in which the liquid mixture is fed into a zig-zag track, which is tilted, such that solid is formed when either edge of the track is at its lowest position, and melted at its highest position, the track being alternately tilted diagonally in opposite directions so that the mother liquors and melted solid are caused to flow in opposite directions along the zig-zag track.

References Cited in the file of this patent

UNITED STATES PATENTS

| | | |
|---|---|---|
| 1,868,406 | Bonath | July 19, 1932 |
| 1,931,347 | Gay | Oct. 17, 1933 |
| 1,999,712 | Zorn | Apr. 30, 1935 |
| 2,552,524 | Cunningham | May 15, 1951 |
| 2,603,667 | Pankratz | July 15, 1952 |
| 2,617,273 | Findlay | Nov. 11, 1952 |
| 2,942,429 | Van Dolah et al. | June 28, 1960 |